(12) United States Patent
Angué et al.

(10) Patent No.: US 7,207,262 B2
(45) Date of Patent: *Apr. 24, 2007

(54) LINEAR DRIVE

(75) Inventors: Eric Angué, Kornwestheim (DE); Simone Kopp, Esslingen (DE)

(73) Assignee: Festo AG: & Co., Esslingen (DE)

( * ) Notice: Subject to any disclaimer, the term of this patent is extended or adjusted under 35 U.S.C. 154(b) by 154 days.

This patent is subject to a terminal disclaimer.

(21) Appl. No.: 11/056,465

(22) Filed: Feb. 11, 2005

(65) Prior Publication Data
US 2005/0193844 A1    Sep. 8, 2005

(30) Foreign Application Priority Data
Mar. 1, 2004    (EP) .................................. 04400012

(51) Int. Cl.
F15B 15/24    (2006.01)
(52) U.S. Cl. ................................... 92/13.5; 92/165 PR

(58) Field of Classification Search .................. 92/13.5, 92/13.6, 165 R, 165 PR
See application file for complete search history.

(56) References Cited

U.S. PATENT DOCUMENTS
| | | | | |
|---|---|---|---|---|
| 5,884,549 A | * | 3/1999 | Hosono et al. | 92/165 PR |
| 2005/0188836 A1 | * | 9/2005 | Angue et al. | 92/88 |

FOREIGN PATENT DOCUMENTS
| | | |
|---|---|---|
| DE | 195 31 523 C2 | 4/1996 |
| DE | 196 49 719 A1 | 6/1998 |
| DE | 100 13 195 A1 | 9/2001 |
| EP | 0 868 965 B1 | 12/2001 |

* cited by examiner

*Primary Examiner*—Michael Leslie
(74) *Attorney, Agent, or Firm*—Hoffmann & Baron, LLP

(57) ABSTRACT

A linear drive having a drive housing on which a carriage runs to an adjustable extent. The carriage covers over a channel-like housing recess, which is delimited by two mutually side wall. For limiting the stroke of the carriage a first abutment is provided on it within the housing recess, such first abutment cooperating is with a first counter abutment, that is so inserted from the outside into an opening in the one side that it extends into the housing recess.

17 Claims, 8 Drawing Sheets

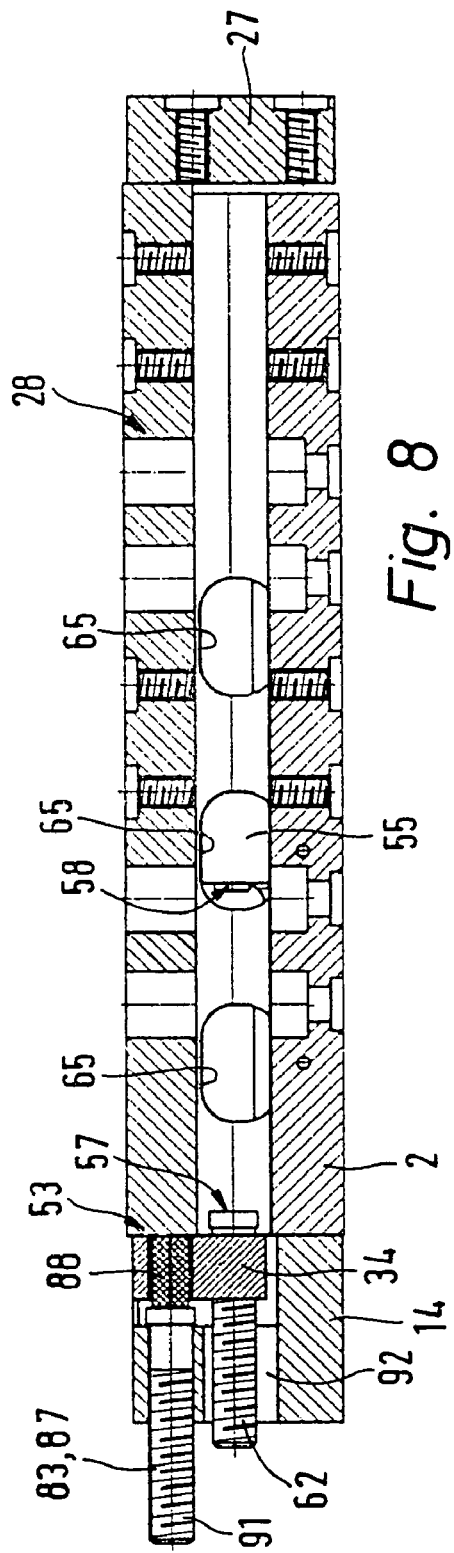
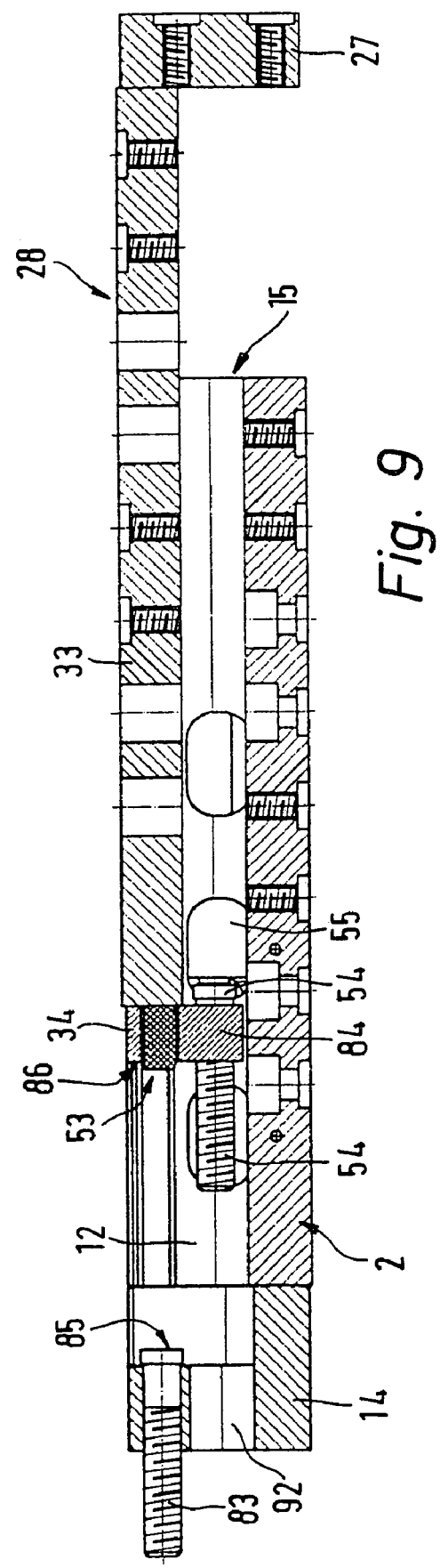

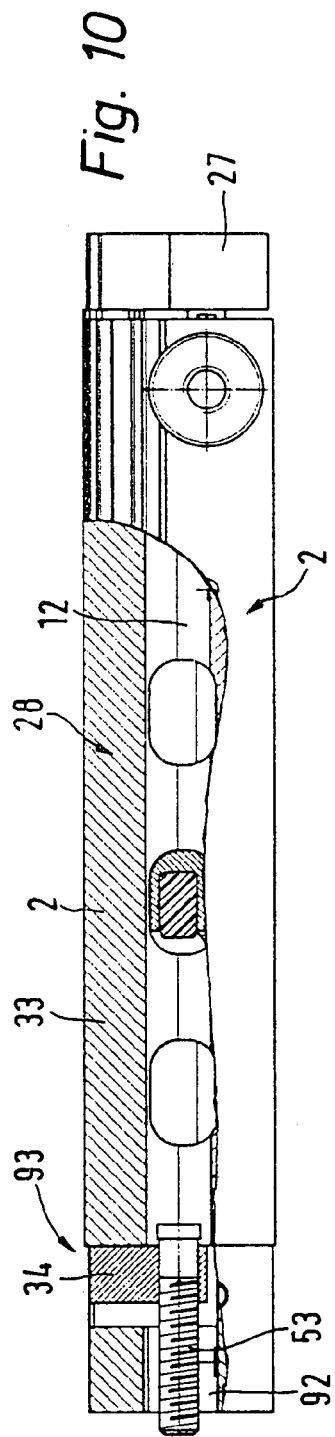
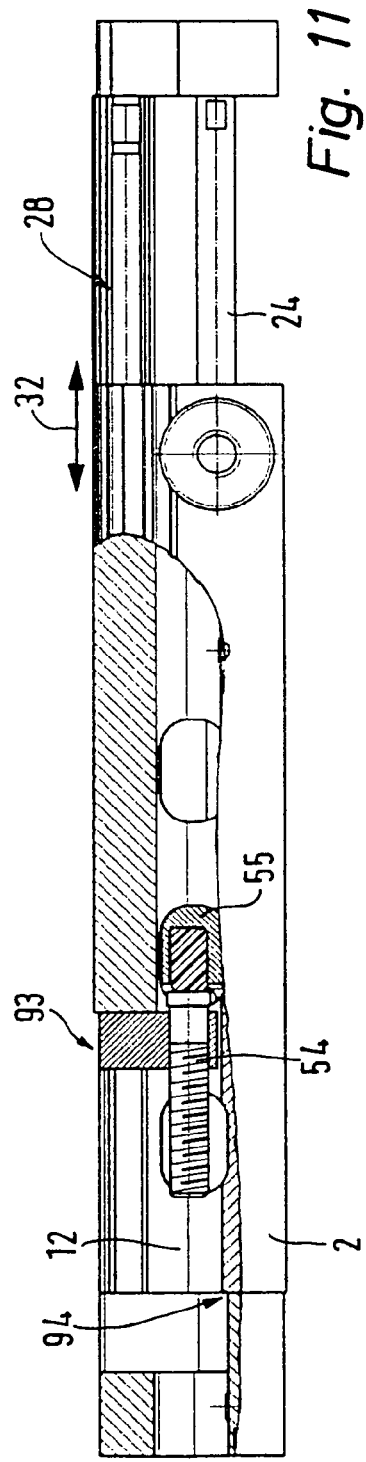
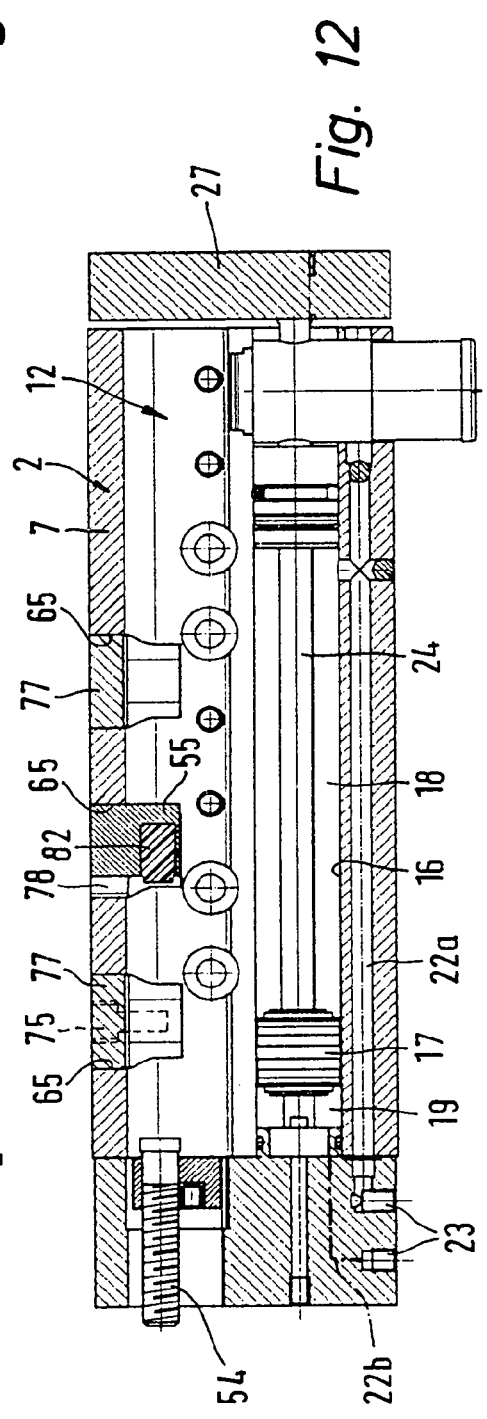

LINEAR DRIVE

BACKGROUND OF THE INVENTION.

The invention relates to a linear drive comprising a drive housing, in which drive means are located which are able to be driven to perform a linear movement and which are drivingly coupled with a linearly guided carriage or slide adapted to run externally on the drive housing, and stroke limiting means effective between the drive housing and the carriage, such limiting means including a first abutment arranged on the carriage and a first counter abutment, arranged on the housing, extending into the path of movement of the first abutment and overlapped by the carriage.

THE PRIOR ART

The European patent publication 0 868 965 B1 discloses a linear drive of this type having a carriage, on whose bottom side a first abutment is arranged, straddling the drive housing, such first abutment cooperating with a counter abutment on the housing lying in its path of movement, in order to define the carriage end position at the end of a stroke in one direction. The working range of such stroke limiting means is a gap-like intermediate space defined between the drive housing and the carriage and left open to the side.

In the case of a linear drive disclosed in the German patent publication 19,531,523 C2 the stroke limiting means are completely uncovered. The counter abutments on the housing cooperating with the carriage are secured by means of attachment clips on the outer periphery of the drive housing. Since different and alternatively employed attachment points are provided for the counter abutments, the carriage stroke may be adjusted over wide ranges.

SHORT SUMMARY OF THE INVENTION

One object of the invention is to create a linear drive which while possessing compact dimensions renders possible a reliable setting of the stroke of the carriage.

In order to achieve these and/or other objects appearing from the present specification, claims and drawings, in the present invention the carriage is so arranged that it covers over the open longitudinal side of a channel-like housing recess, delimited by two opposite side walls, in the drive housing for a greater or smaller length dependent on the position, the first abutment being located within the housing recess and at least one of the side walls having at least one opening, into which the first counter abutment cooperating with the first abutment may be so inserted from the outside that it extends laterally into the housing recess.

Accordingly at least the first abutment and the first counter abutment cooperating with it are located in a channel-like housing recess in the drive housing so that the working range of such stroke limiting means may if necessary be sealed off from the outside, something which reduces the danger of injury and the tendency to collect dirt. Installation of the first counter abutment in an opening in one of the side walls delimiting the channel-like housing recess ensures adequate accessibility for the first counter abutment, for example for the purpose of modernizing the drive or for servicing. Given a suitable design of the carriage there is furthermore the possibility of installing the first abutment and the counter abutment in such a manner that on mutual impact between them a symmetrical distribution of forces takes place which eases loads from the guide means present for linear guidance of the carriage.

Further advantageous developments of the invention are defined in the claims.

For the formation of the channel-like housing recess the drive housing is preferably U-like in outline. The two limbs then represent the opposite side walls of the housing recess.

The first abutment is preferably seated on a support wall arranged on a terminal end portion of the carriage, said wall protruding into the channel-like housing recess. This support wall may be plate-like in shape and preferably corresponds essentially to the inner outline or contour of the channel-like housing recess.

In order to undertake fine adjustment of the corresponding carriage position the first abutment is preferably arranged in an axially adjustable fashion on the support wall, there being more particularly a possibility of stepless setting.

This provision for fine adjustment is more particularly highly advantageous, when in the side wall of the drive housing a plurality of spaced wall openings are provided spaced apart in the stroke direction of the carriage, such openings being able to be selectively fitted with the first counter abutment. For coarse adjustment of the stroke the first counter abutment in the desired carriage end position may be positioned at the nearest wall opening. The fine adjustment may then be performed using the adjustable first abutment.

The adjustment of the first abutment is facilitated if a terminating wall delimiting the channel-like housing recess at the end has a window-like opening opposite to the first abutment in the stroke direction. This opening furthermore renders possible insertion of the sections, axially projecting past the carriage, when the carriage moves into the second carriage position. As a result the overall length of the drive housing may be kept comparatively short.

The first counter abutment is preferably so able to be inserted into the associated wall opening with a interlock that it may bear against the housing in the stroke direction of the carriage. Accordingly the forces taking effect on impact of the carriage or slide are for the most part taken up by the housing and precise maintenance of the position of the first counter abutment is ensured.

The linear drive may be of the piston rod-less type. Preferably however a coupling rod is provided for the transmission of the drive force between the drive means and the carriage. A clamping unit inserted into the drive housing may cooperate with this coupling rod and serves to temporarily arrest the coupling rod in the axis direction in relation to the drive housing in order to position the carriage as required.

Particularly compact dimensions, in conjunction with an extremely firm support for the carriage, are possible it is so sunk into the channel-like housing recess that it is flanked at both its longitudinal sides by the side wall of the housing recess. Between the two longitudinal sides and the side wall there is preferably a guide means for linear guidance.

In order to visually check the stroke limiting function the outer contour or outline of the first counter abutment may be so adapted to the inner outline of the associated wall opening that there remains an inspection window making it possible to look into the channel-like housing recess from the outside.

The stroke limiting means render possible, preferably in the case of both stroke directions, a setting of the carriage end position.

For this purpose in addition to the pair of cooperating first abutments and counter abutments a further pair of cooperating second abutments and counter abutments may be present, the first pair being effective in the one stroke direction and the other pair being effective in the other stroke direction. The second abutment is preferably seated at a terminal end portion of the carriage within the channel-like housing recess, while the second counter abutment is arranged on a terminating wall delimiting the housing recess, in an axial extension thereto.

Each abutment or, respectively, each counter abutment may be in the form of a plain fixed abutment or also comprise shock absorber means to reduce impact.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 8 shows the linear drive with the carriage in the retracted position on the section line VIII—VIII of FIG. 5.

FIG. 9 is a longitudinal section of the linear drive on the section line VIII—VIII of FIG. 5, the carriage assuming the extended position in accordance with FIGS. 2 and 4.

FIG. 10 is a longitudinal section in the operational condition of FIG. 8 and on the section line X—X of FIG. 5.

FIG. 11 shows a longitudinal section in the operational position of FIG. 9 again on the section line X—X.

FIG. 12 shows a further longitudinal section taken through the linear drive in the retracted position of the carriage and on the section line XII—XII of FIG. 5.

DETAILED ACCOUNT OF WORKING EMBODIMENTS OF THE INVENTION

Figure 1:
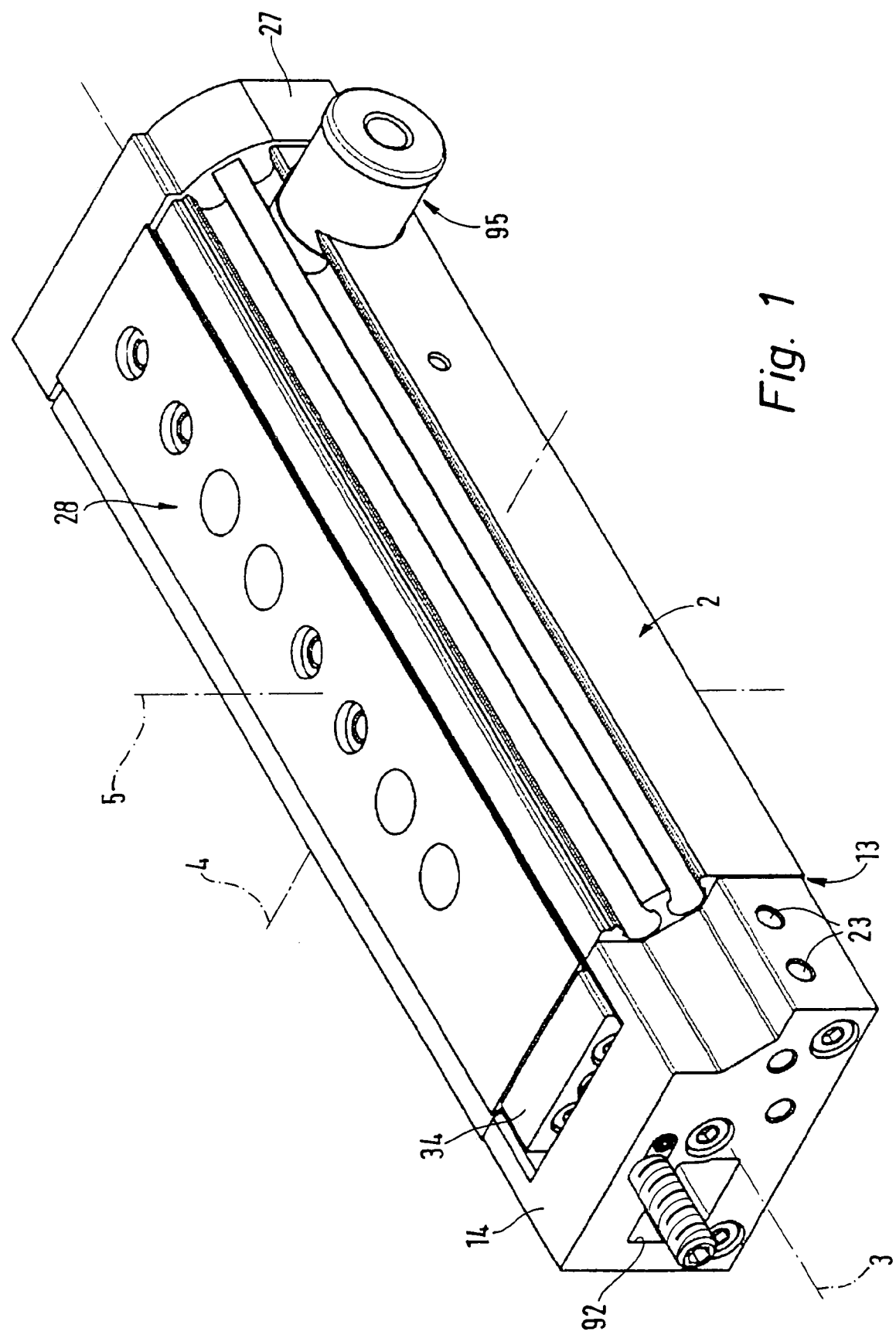
FIG. 1 shows a first preferred design of the linear drive in a perspective rear view with the carriage retracted.

The linear drive depicted in the drawings is designed for operation using fluid power, although it could also be electrically activated.

The linear drive possesses a drive housing 2 having an elongated configuration with a longitudinal axis 3, a transverse axis 4 perpendicular thereto and an upright axis 5 again perpendicular to the two above mentioned axes. The said three axes thus subtend a Cartesian coordinate system.

The drive housing 2 is in cross section preferably U-like (see more especially FIGS. 6 and 7), the housing sections corresponding to the two U limbs defining two first and second side walls 6 and 7 parallel to each other in the direction of the longitudinal axis 3. The housing section corresponding to the U cross stroke constitutes a floor wall 8, which together with two side walls 6 and 7 delimit a channel-like housing recess 12, which is open at the longitudinal side opposite to the floor wall 8.

At the rear end side 13 the channel-like housing recess 12 is delimited by an end terminal wall 14 mounted on the end face of the drive housing 2. At the opposite front end side 15 the housing recess 12 on the other hand is however open.

In the direction of the transverse axis 4 the first side wall 6 has a greater thickness than the comparatively narrow second side wall 7. This is because of a peripherally enclosed cavity extending longitudinally formed in the interior, which is here termed the drive space 16, since in it there are drive means 17 able to be driven to perform a linear translatory motion in the direction of the longitudinal axis 3.

In the working embodiment the drive means 17 comprise a piston able to run in the drive space 16 and which divides up the drive space 16 in a sealing manner into a front and a rear working chamber 18 and 19. Into each working chamber 18 and 19 there opens a separate fluid duct 22a and 22b, through which a fluid medium may be supplied or removed in order to so act on the piston 17 in a controlled manner that same is shifted in the desired fashion. The fluid supply is by way of flexible fluid pipes, not illustrated in detail, which are able to be connected with connection openings 23 communicating with the fluid ducts 22a and 22b, such openings preferably being located of the outer face of the terminal end wall 14.

A coupling rod 24 in the form of piston rod is attached on the one hand to the piston 17 and extends at the other end at the front end side 15 out of the drive housing 2. It extends in a sealed manner through a stuffing box 25 or cover inserted into the drive space 16 from the front end side 15, such box 25 being axially held in place by a transverse pin 26 extending right the way through the drive housing 2. The rear sealed termination of the drive space 16 is provided by the terminal end wall 14, which covers the opening of the drive space 16.

The end section, extending out of the drive housing 2, of the coupling rod 24 is joined to a connecting yoke 27 in a manner resisting push and pull forces, such yoke 27 being a component of a carriage or slide 28 movingly mounted on the outside of the drive housing 2 for linear movement in the direction of the longitudinal axis 3. Accordingly the drive means 17 are kinematically coupled with the carriage 28 and the carriage 28 performs a linear stroke movement 32 on corresponding actuation of the drive means 17.

Figure 6:
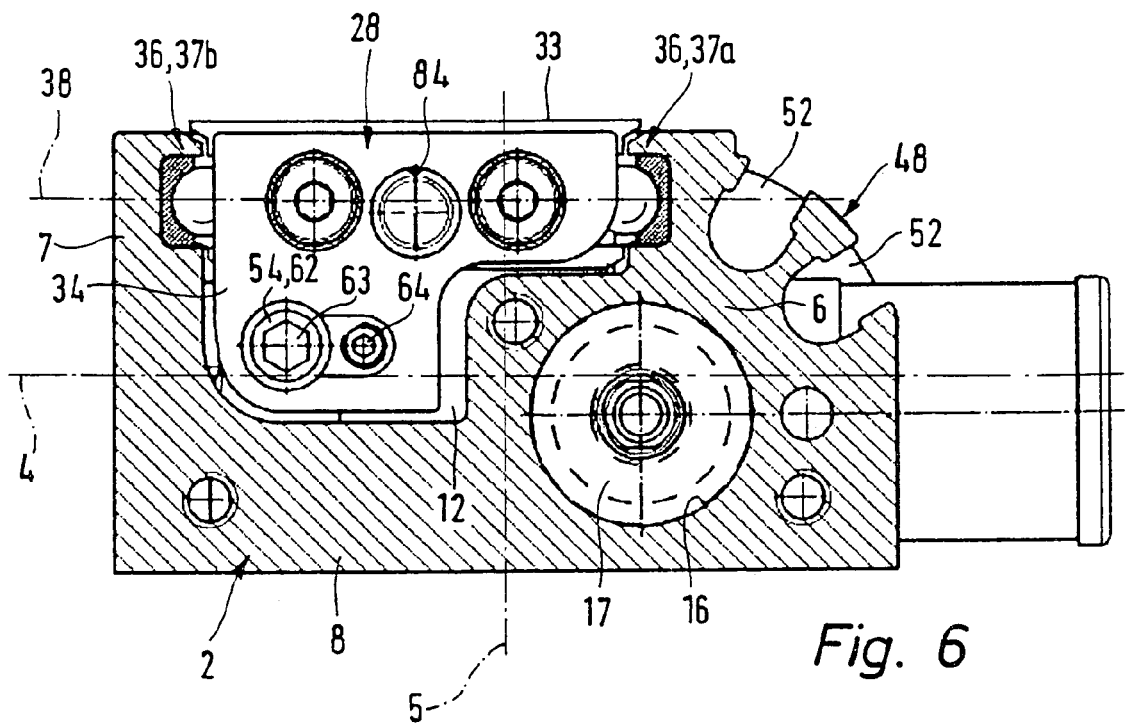
FIG. 6 shows a cross section taken through the linear drive on the section VI—VI in FIG. 2.
Figure 7:
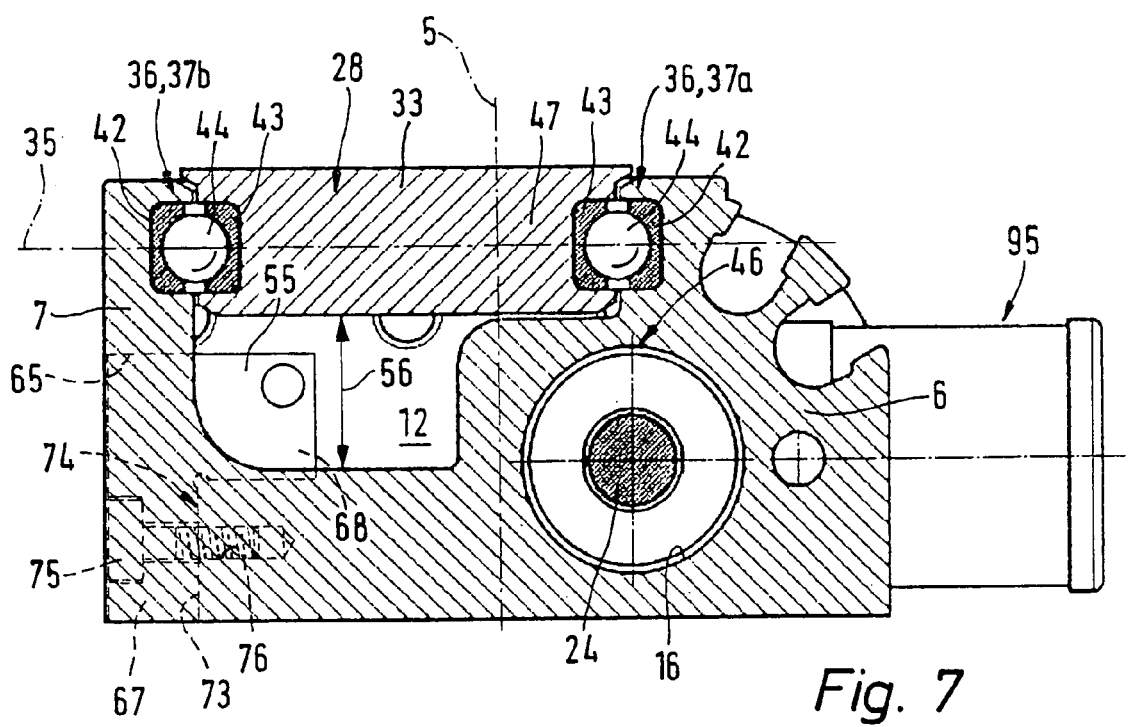
FIG. 7 is a cross section taken through the linear drive on the section line VII—VII in FIG. 2.
Figure 13:
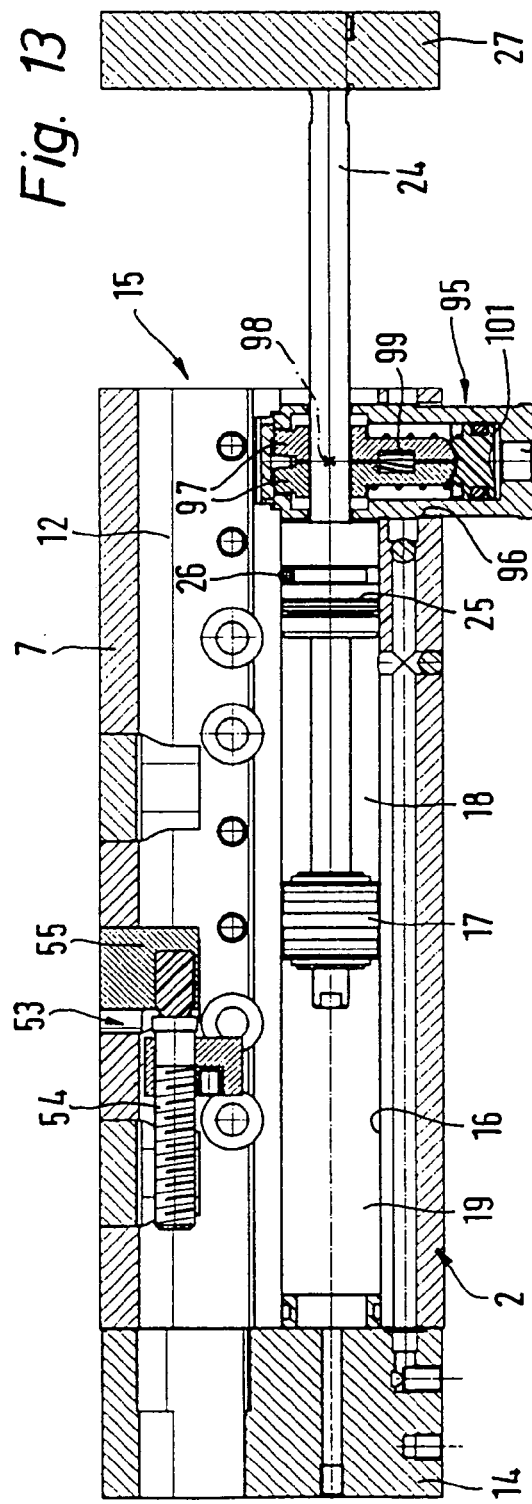
FIG. 13 shows a section as in FIG. 12 through the linear drive with the carriage assuming the extended position thereof.
Figure 14:
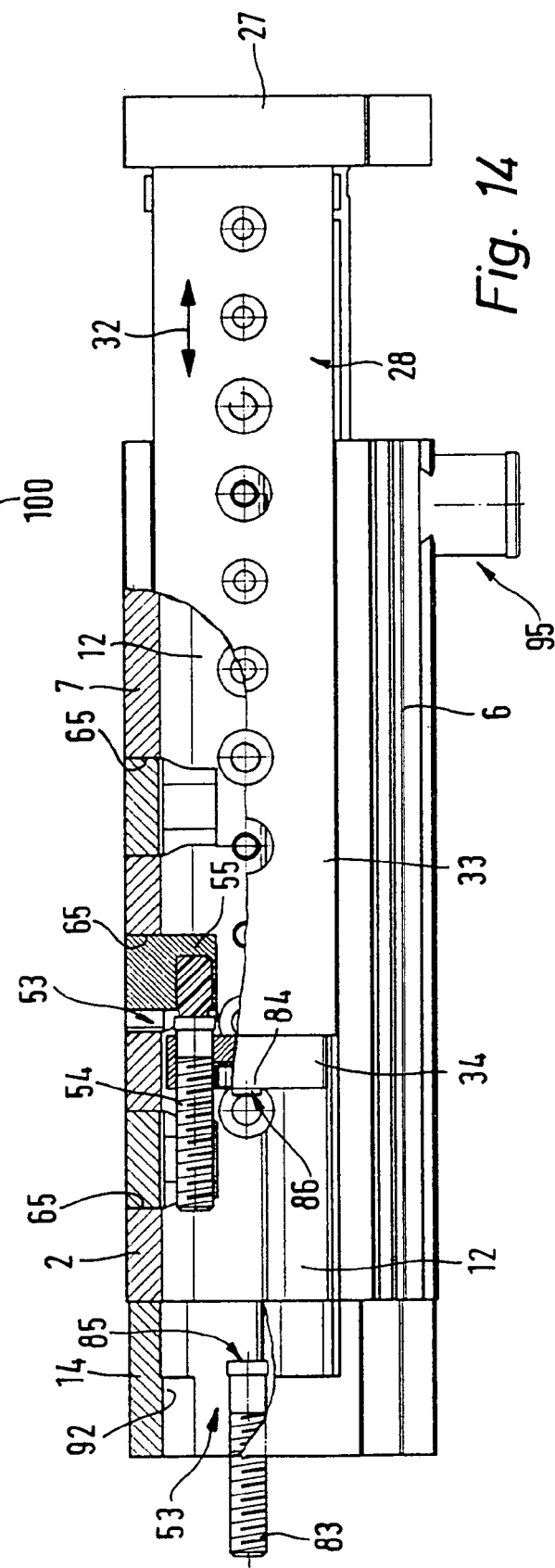
FIG. 14 shows a partly broken away plan view of the linear drive looking in the direction of the arrow XIV in FIG. 5 with the carriage in the extended position.

As more particularly shown in FIGS. 6 and 7 the drive space 16 assumes an off center position within the drive housing 2 as related to the transverse axis 4. The center of the drive space 16 is consequently offset in the direction of the transverse axis 4 in relation to the cross section center of the drive housing 2 toward the housing edge.

The carriage 28 on the other hand is related to the channel-like housing recess 12, it having a plate-like principal carriage part 33 adjoining the connecting yoke 27 in the direction of the longitudinal axis 3, and on the rear side of the part 33 opposite to the connecting yoke 27 there is furthermore a preferably plate-like support wall 34.

The principal carriage part 33 is so aligned that its plane 35 of extent extends perpendicularly to the upright axis S.

Figure 2:
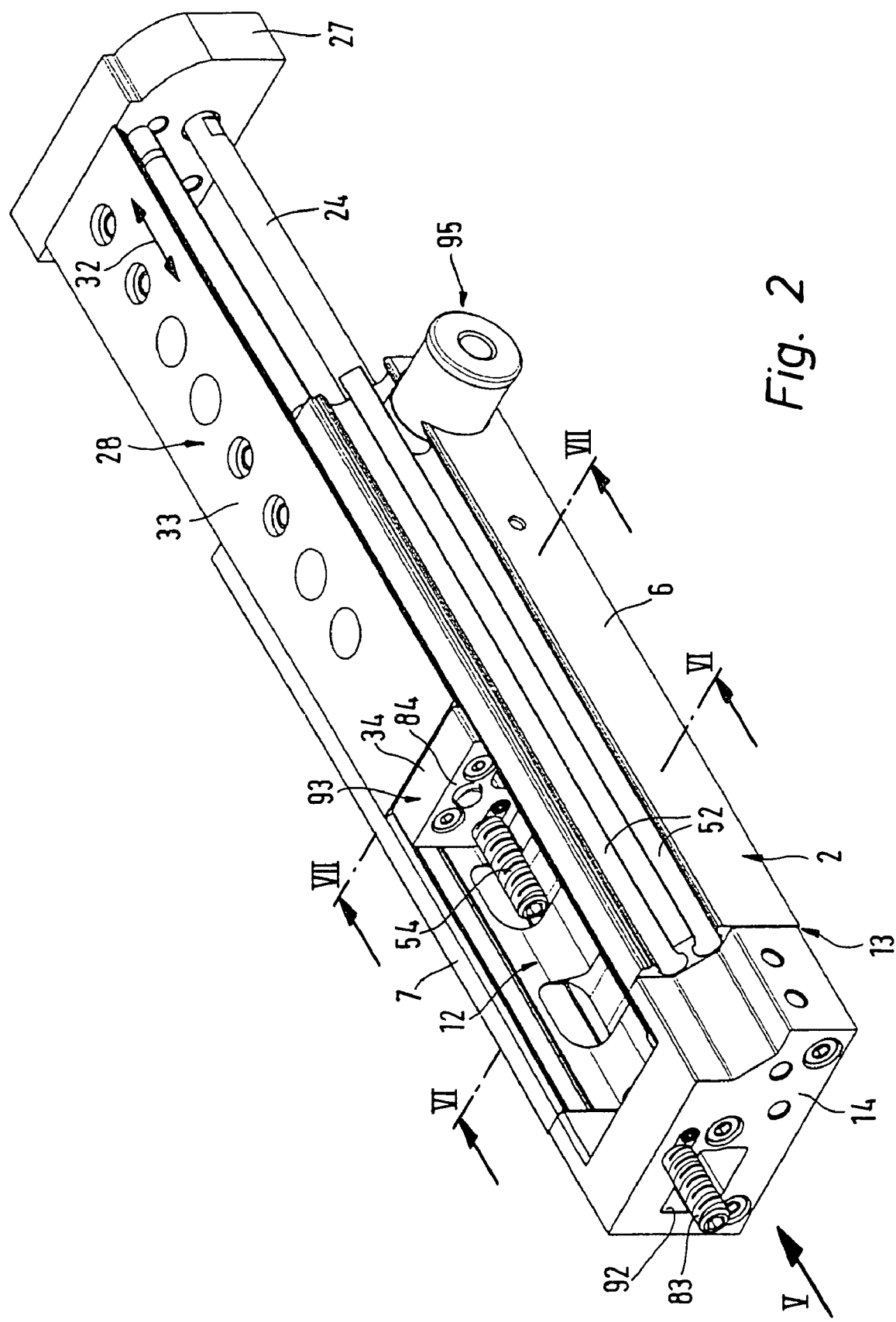
FIG. 2 shows the linear drive of FIG. 1 in a corresponding representation with the carriage extended.
Figure 3:
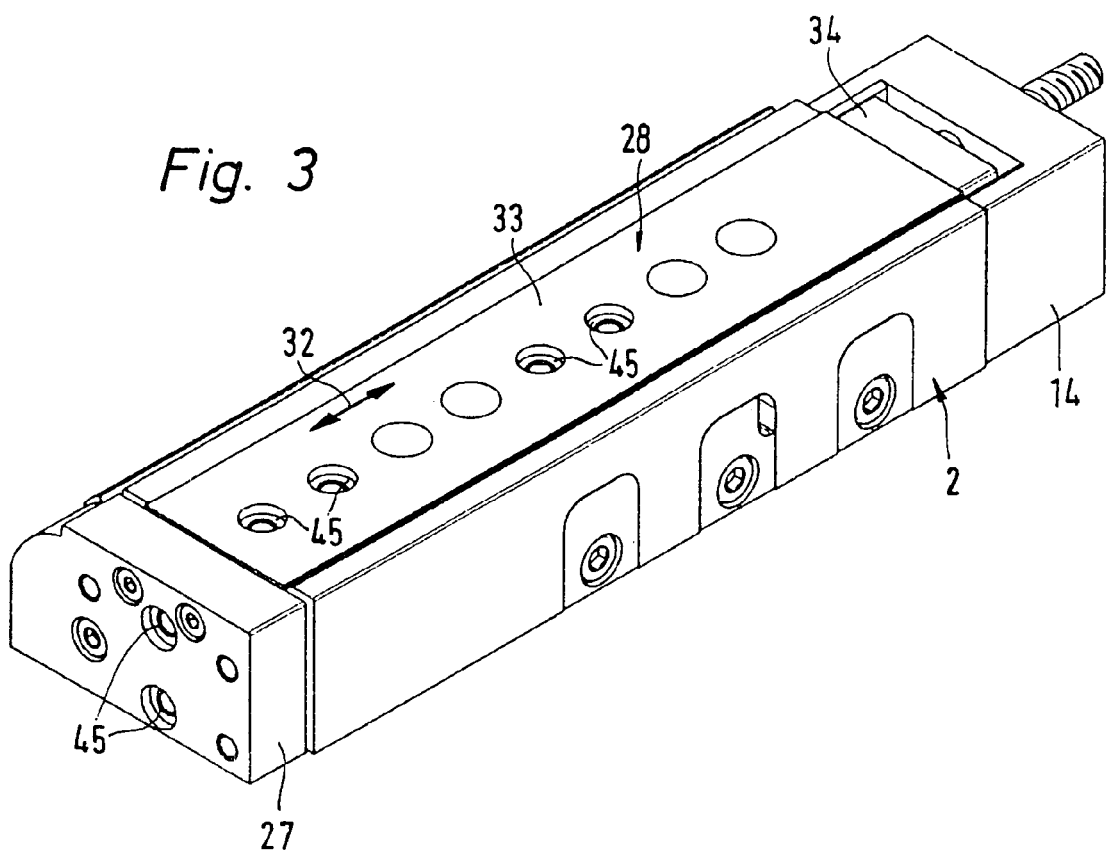
FIG. 3 is a perspective front view of the linear drive in the condition of FIG. 1.
Figure 5:
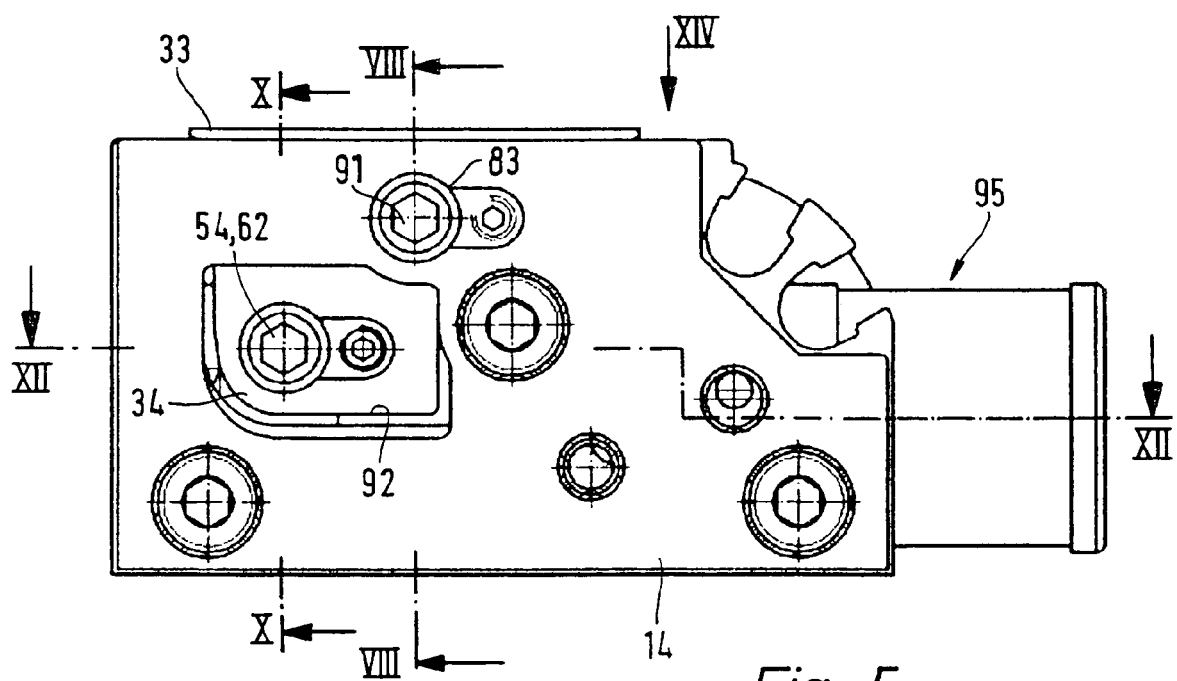
FIG. 5 shows the rear side of the linear drive looking in the direction of the arrow V in FIG. 2.
Figure 4:
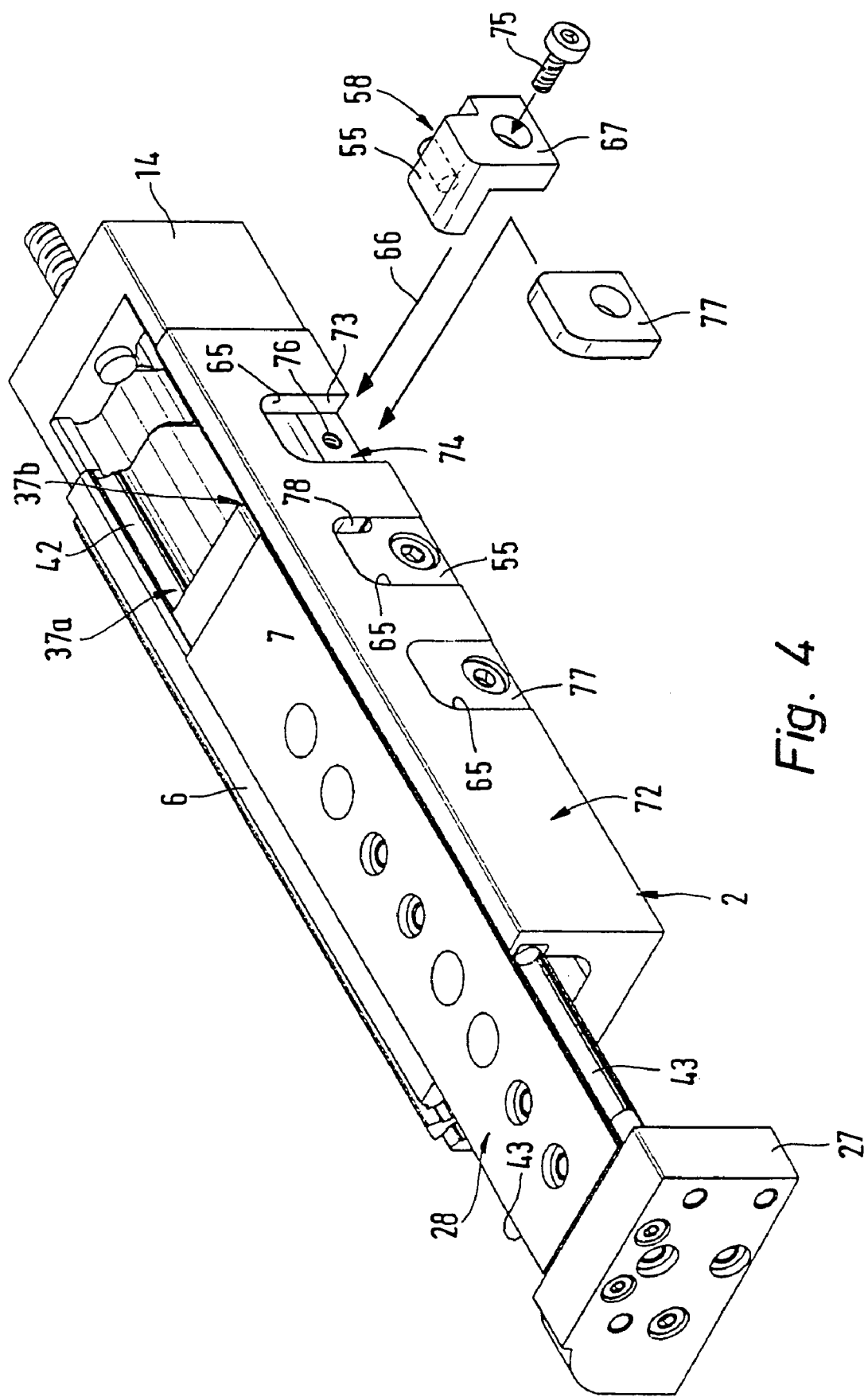
FIG. 4 is a perspective front view of the linear drive in the condition of FIG. 2, the use of a substitute first counter abutment being indicated.

The length of the carriage 28 is essentially the same as that of the drive housing 2, the carriage 28 more particularly having its principal part 33 extending at and along the open longitudinal side of the channel-like housing recess 12. Accordingly it practically constitutes a cover for the open longitudinal side of the housing recess 12, the covered length being capable of adjustment and being dependent on the current position of the carriage 28. If the coupling rod 24 is moved as far as possible into the drive space 16, there will be the retracted carriage position illustrated in FIGS. 1 and 3, in which the carriage 28 covers over the channel-like housing recess 12 for practically its entire length. If the coupling rod 28 on the other hand is extended farther out of the drive housing 2, the carriage 28 as well will extend farther out past the front end side 15 of the drive housing 2 so that now only the length section, corresponding to the front end side 15, of the housing recess 12 is covered by the carriage 28, whereas the housing recess 12 is in other respects left free (FIGS. 2 and 4).

The carriage 28 is so sunk into the channel-like housing recess 12 in the direction of the upright axis 5 that it is flanked at its two longitudinal sides by the two side walls 6 and 7. This is made clear in FIG. 7. As a result the carriage 28 does not extend, or only hardly extends, in the direction of the upright axis 5 past the drive housing 2, something which means a comparatively small overall height.

For guiding and supporting the carriage 28 in relation to the drive housing 2 a guide means 36 is provided, which has two parallel guide units 37a and 37b arranged at a distance apart, which are placed in the direction of the transverse axis 4 between the carriage 28 and the drive housing 2. Stated more precisely, the carriage 28 is flanked at its mutually opposite longitudinal sides externally by the two guide units 37a and 37b, each guide unit 37a and 37b again being flanked by an end section of the side walls 6 and 7 extending past the carriage 28. In accordance with FIGS. 6 and 7 the two guide units 37a and 37b jointly extend in a guide plane 38, perpendicular to the upright axis 5, such guide plane 38 coinciding in the working embodiment with the plane 35 of extent of the principal carriage part 33.

Each guide unit 37a and 37b possesses a housing side guide track 42 arranged on the inner side (facing the respectively other side wall) of the associated first and second side wall 6 and 7. These housing side guide tracks 42 preferably extend along the entire length of the drive housing 7. Each housing side guide track 42 is opposite to a carriage side guide 43 track in the direction of the transverse axis 4, such track extending along the principal carriage part 33. Between each pair of mutually associated housing side and carriage side guide tracks 42 and 43 there is a bearing element arrangement 44, which more especially comprises a group of anti-friction bearing elements collected in a cage. If the carriage 28 performs a stroke movement 32, the bearing element arrangement 44 will run along the guide tracks 42 and 43 cooperating with it so that there is a precise guiding action for the carriage 28.

The guide tracks 42 and 43 are preferably formed on bar-like guide elements, which are permanently applied to the drive housing 2 or, respectively, the carriage 28.

By means of the guide means 36 forces acting on the carriage 28 and transmitted to the drive housing 2. These forces may originate at any mass, which is attached to the carriage 28 for the purpose of changing its position. In the case of such mass it can for example be a question of a component of a machine or of a further linear drive. Attachment means 45 arranged on the carriage 28, for example in the form of threaded holes, render possible the detachable coupling of the respective load. Such attachment means 45 are preferably provided both on the principal carriage part 3 and also on the connecting yoke 27.

The guide units 37a and 37b are preferably so installed that the resulting guide plane 38 is arranged in the direction of the upright axis 5 with an offset in relation to the drive space 16. The size of the offset is more particularly so selected that the principal carriage part 33 is higher in the direction of the upright axis 5 than the top apex portion 46 of the drive space 16. Thus in the working example there is the advantageous possibility of placing the housing side guide track 42 of the first guide unit 37a, associated with the first side wall 6, extending past the drive space 16 in the direction of the upright axis 5 so that in the direction of the transverse axis 4 the drive space 16 is overlapped at least for some distance by the longitudinal edge section 47 (bearing the carriage side guide track 43 of the first guide unit 37a) of the carriage 28.

More particularly there may be a provision such that the housing side guide track 42 of the first guide unit 37a is essentially located in the zone over the top apex portion 46 of the drive space 16.

The carriage 28 is accordingly so arranged that it overlaps the drive space 16 somewhat in the transverse direction of the drive housing 2, while on the other hand together with the two side walls 6 and 7 and the floor wall 8 it delimits a cavity, which in a manner remaining to be described is excellently suited for stroke limiting measures.

Since the guide units 37a and 37b are at a large distance from each other in the direction of the transverse axis 4, there is a satisfactory supporting action for the carriage 28 to resist tilting moments acting on it.

Preferably the carriage 28 also extends past the drive space 16 only a small distance so that alongside and adjacent to the associated edge section 47 of the carriage 28 there remains an uncovered edge section 48 of the first side wall 6 of the drive housing 2, which is able to be employed for the integration of one or more anchoring slots extending in the direction of the longitudinal axis 3. These anchoring slots 52 more particularly render possible the anchoring of sensors, with which a contact-free detection of positions of the drive means 17 arranged in the drive space 16 is possible. Accordingly the relevant principal positions of the carriage 28 may ultimately be detected.

Since the edge section 48 not covered by the carriage 28 of the second side wall 7 possesses a rounded outline, it is readily possible for several and more particularly two anchoring slots to be provided placed alongside each other without mutual hindrance.

The linear drive is provided with stroke limiting means 53, which render possible a range of adjustment of the stroke limitation of the carriage 28 in both directions of the stroke. Accordingly there is the possibility, irrespectively of the stroke as set by the drive means 17, of setting the desired carriage position in the extended position and the terminal carriage position desired in the retracted position. The stroke limiting means 53 act indirectly or directly between the drive housing 2 and the carriage 28.

In order to set the extended terminal carriage position a first abutment 54 arranged on the carriage 28 and a first counter abutment 55 secured to the housing and extending into the path of movement are provided. Both abutments are located within the channel-like housing recess 12 in the height section 56, which is defined, when carriage 28 is retracted, in the height direction between the carriage 28 and the floor wall 8.

The first abutment 54 is arranged on the rear end side, facing the end side terminal wall 14, of the carriage 28, such first abutment preferably being arranged on the section, extending into the height section 56, of the support wall 34. The first abutment 54 has a first abutment face 57 orientated in the extension direction, that is to say facing toward the connecting yoke 27, such first face 57 facing a first counter abutment face 58 arranged on the first counter abutment 55, the first counter abutment 55 being located in a portion of the channel-like housing recess 12 overlapped or straddled by the principal carriage part 33. The first counter abutment 55 is consequently shielded off from the surroundings by the carriage 28.

In the working embodiment the first abutment 54 is in the form of an abutment screw 62, which extends through the support wall 34, there being an abutment head, bearing the first abutment face 57, underneath the carriage 28, whereas an adjustment shank, provided with a thread, projects to the rear toward the end side terminal wall 14 from the support wall 34. At the free end of the adjustment shank of the abutment screw 62 there is an actuation part 63 rendering possible the engagement of a screw driver or the like, there being the possibility of turning the abutment screw 62 to adjust, more particularly in a stepless manner, the axial position of the first abutment face 57 in relation to the carriage 28. Suitable locking means 64 permit holding the adjustment made with a lock nut effect.

For the installation of the first counter abutment 55 the second side wall 7 farther removed from the drive space 16 in the direction of the transverse axis 4, is provided with a plurality of wall openings 65, which respectively connect the channel-like housing recess 12 with the surroundings of the drive housing 2, the first counter abutment 55 being so inserted from the outside into one of the wall openings 65 that it protrudes laterally into the housing recess 12 and thence into the path of motion of the first abutment 54.

The wall openings 65 are arranged some distance apart in the stroke direction of the carriage 28. Accordingly by selective adaptation of one of these wall openings 65 the possible extension stroke and accordingly the preset terminal extended position may be approximately set in several steps. In the working embodiment there are in all three wall openings 65, the first counter abutment 55 being installed in the middle wall opening 65. It could however for example, as is indicated in FIG. 4, be inserted in one of the two other wall openings 65 in order to ensure that the carriage is extended in the end position to a greater or lesser distance from the drive housing 2.

There is therefore the possibility using a suitable design of the wall openings 65 with a first counter abutment 55 to provide for a coarse setting of the extension stroke in order then to undertake subsequent fine adjustment.

The number of the wall openings 65 and their distance apart is as a rule adapted to the overall length of the drive housing 2 and the maximum possible carriage stroke. If the maximum possible carriage stroke is for example very small, even a single wall opening 65 may be sufficient for the installation of a first counter abutment 55 so that then further setting may be performed exclusively by adjustment of the first abutment 54.

As viewed in the insertion direction 66 the outline of the first counter abutment 55 is so adapted to the inner outline or contour of the respective wall opening 65 that the insertion is a plugging operation, in which an interlocking connection between the first counter abutment 55 and the drive housing 2 is produced ensuring support of the first counter abutment 55 in the stroke direction of the carriage 28, at least in its extension direction.

Preferably the first counter abutment 55 possesses a holding part 67 and an abutment part 68 having a smaller cross section than it, the abutment part having the entire counter abutment face 58 and projecting in the insertion direction in relation to the holding part 67. The wall opening 65 is stepped in the insertion direction 66 and becomes wider toward the outer face 72 as far as an attachment section 73 which is partly delimited by an outwardly facing attachment face 74 defined by the floor wall 8. In the inserted condition the holding part 67 contacts the attachment face 74, whereas the abutment part 68 extends past the attachment face 74 into the housing recess 12. By means of a housing section having a releasable screw connection between the holding part 67 and the attachment face 74 it is possible for the first counter abutment 55 to be reliably held in place. As an example in this connection there is an attachment screw 75, which is extends through the holding part 67 with a supporting effect and is able to be screwed into a threaded hole, open toward the attachment face 74, in the drive housing 2.

The wall opening 65 not currently required for abutment purposes may however be closed in a releasable manner by a cover 77, which for example is attached in the same fashion as the first counter abutment 55 or however by a detent or catch connection. Sealing off using a cover will prevent the entry of dirt. While the first counter abutment 55 is more particularly made of metal, the covers employed may certainly be made of plastic material.

The configuration is more especially so selected that in the installed state of the first counter abutment 55 and of the covers 77 there is a termination flush with the outer face 72 of the drive housing 2.

In order in case of need to check the stroke limiting function in the working example the outline of the first counter abutment 55 is so designed that it does not completely comply with the inner outline or contour of the associated wall opening 65 so that between the two outlines there is a continuous free space defining a window 78 through which it is possible to view the abutment part 68 placed in the housing recess 12.

In order to minimize mutual impact the counter abutment 55 is fitted with a buffer element 82 of rubber elastic material extending toward the first abutment 54. In addition or as an alternative more particularly the first abutment 54 might be designed not in the form of a simple fixed abutment but as one combined with shock absorber means.

In order as well to adjust the terminal extended position of the carriage or slide, the stroke limiting means 53 comprise furthermore a second abutment 83 borne by the drive housing 2 and which preferably is arranged on the end side terminal wall 14 and possesses a second abutment face 85 facing the carriage 28 in the direction of the longitudinal axis 3. The abutment face 85 is opposite to a second counter abutment face 86 orientated in the retraction direction of the carriage and provided on a second counter abutment 84 arranged at the rear end portion of the carriage 28. The counter abutment 84 is in the working embodiment formed directly by the end face of the support wall 34, whereas the second abutment 83 is, like the first abutment 54, in the form of an abutment screw 87, which is screwed right the way through the end side terminal wall 14 and may be adjusted in relation to same axially. The adjustment and locking in position take place in the same manner as with the abutment screw 62 constituting the first abutment 54.

In the working embodiment the second abutment 83 is also provided with a buffer element 88.

For all abutment means there is the possibility of providing shock absorber means if required, either separately or in combination with the respective abutment in order to more especially to provide for fluid end position damping, as for example using hydraulic shock absorbers.

The second abutment 83 is readily accessible from the rear side of the drive housing 2 for adjustment of the retracted carriage position, since its actuating part 91 of the abutment 83 adapted for engagement of an adjusting tool lies on the outer side, opposite to the carriage 28, of the end side terminal wall 14.

In order to perform similar adjustment of the first abutment 54 as well the terminal wall 14—flush with the first abutment 54 in the stroke direction of the carriage 28—is provided with a window-like opening 92. Through such opening 92 actuation of the first abutment 54 is possible for adjustment purposes irrespectively of the stroke position of the carriage 28.

There is furthermore the advantage that the length section, projecting past the carriage 28 at the rear of the first abutment 62, may plunge into the window-like opening 92 or may even extend right the way through the opening 92, when the rear end portion of the carriage 28, in the retracted carriage end position, assumes a position in the direct vicinity of the terminal wall 14. This renders possible a substantial saving in the overall length of the drive housing 2.

In the working embodiment there is the further advantage that the end portion, bearing the first abutment 54, of the carriage 28—in the present case constituted by the support wall 34—functions as an ejection head 93 which during the retraction stroke of the carriage expels any dirt or foreign bodies present in the housing recess 12 out through the window-like opening 92 into the surroundings.

In order to ensure that such dirt is not retained by an obstructing step in the transition to the terminal wall 14, the inner outline of the window-like opening 92 preferably so designed that it is at least flush at the side and floor walls defining the housing recess 12 at least as far as the floor wall is concerned, and however preferably is even stepped back to a minimum extent athwart the longitudinal axis 3. The stepped back portion is referenced 94 in FIG. 11.

Contact between the ejection head 93 and the drive housing 2 is not necessary for ensuring the expulsion function and furthermore an elastic seal is generally unnecessary. Since the support wall 34 has an outer outline or contour essentially corresponding to the inner outline of the housing recess 12, an extremely small gap size may be observed so that the expulsion function is ensured even without contact being made. As shown in drawing the ejection head 93 extends at least approximately as far as the floor wall 8, opposite to the open longitudinal side of the housing recess 12, of the channel-like housing recess 12.

It is convenient for the linear drive to be provided with a clamping unit 95 by which the coupling rod 24 may be held during any desired time without being able to move in relation to the drive housing 2.

The clamping unit 95 is cartridge-like in design and inserted in the portion, which is axially to the fore of the connection yoke 27 in the terminal cover 25, from the side into a recess 96 in the drive housing 2, the coupling unit 24 extending through the clamping unit 95.

The clamping unit 95 is more especially designed for fluid power operation. It preferably comprises two gripping jaws 97 able to be pivoted about a pivot axis 98 extending perpendicularly to the longitudinal axis of the coupling rod 24, the coupling rod 24 extending through the two jaws and being normally so spread apart by a spring means 99 between them that they act with a clamping effect on the outer periphery of the coupling rod 24. In order to overcome the arresting action pressure medium may be supplied by way of a fluid connection 100, which shifts an actuating piston 101 against the clamping jaws 97 so that same are pivoted against the spring force into a released position, in which the coupling rod 24 is freed for the axial movement.

Since the clamping unit 95 is fitted in the housing recess 12 with a tight tolerance, play-free attachment in the stroke direction of the carriage 28 is ensured, something which ensures play-free arresting of the piston rod and accordingly also of the carriage 28 connected with it.

The invention claimed is:

1. A linear drive comprising a drive housing, in which drive means are located which are able to be driven to perform a linear movement and which are drivingly coupled with a linearly guided carriage or slide adapted to run externally on the drive housing, and stroke limiting means effective between the drive housing and the carriage, the limiting means including a first abutment arranged on the carriage and a first counter abutment, arranged on the housing, extending into the path of movement of the first abutment and overlapped by the carriage, wherein the carriage is so arranged that said carriage covers over an open longitudinal side of a channel-like housing recess, delimited by two opposite side walls, in the drive housing for a greater or smaller length dependent on the position, the first abutment being located within the housing recess and at least one of the side walls having at least one wall opening, into which the first counter abutment for cooperating with the first abutment may be so inserted from the outside that said first counter abutment extends laterally into the housing recess.

2. The linear drive as set forth in claim 1, wherein the drive housing is contoured in a U-like shape for the formation of the channel-like housing recess.

3. The linear drive as set forth in claim 1, wherein at a terminal end portion the carriage has a support wall bearing the first abutment and extending into the channel-like housing recess.

4. The linear drive as set forth in claim 3, wherein an outer contour of the support wall essentially corresponds to an inner contour of the channel-like housing recess.

5. The linear drive as set forth in claim 3, wherein the first abutment is arranged on the support wall for axial adjustment.

6. The linear drive as set forth in claim 3, wherein the channel-like housing recess in the extension of the carriage is delimited by a terminating end wall opposite to the support wall, the terminating wall having a window-like opening flush with the first abutment in the stroke direction of the carriage.

7. The linear drive as set forth in claim 1, wherein in one and the same side wall a plurality of said wall openings are provided spaced from each other in the stroke direction of the carriage, said wall openings being able to be selectively fitted with the first counter abutment.

8. The linear drive as set forth in claim 1, comprising at least one cover for temporarily closing the wall opening not fitted with the first counter abutment.

9. The linear drive as set forth in claim 1, wherein the first counter abutment is able to be inserted into the wall opening in an interlocking manner so that said first counter abutment bears against the drive housing in the stroke direction of the carriage.

10. The linear drive as set forth in claim 1, wherein the drive means are connected with a coupling rod, which at the end extends from the drive housing and engages the carriage.

11. The linear drive as set forth in claim 10, comprising a clamping unit inserted into the drive housing and having the coupling rod extending through said clamping unit for axially arresting the coupling rod in relation to the drive housing.

12. The linear drive as set forth in claim 1, wherein the carriage is so sunk into the channel-like housing recess that at two longitudinal sides of said carriage, said carriage is flanked by the side walls of the housing recess.

13. The linear drive as set forth in claim 1, wherein the first counter abutment inserted into the wall opening externally ends flush with the outer face of the drive housing.

14. The linear drive as set forth in claim 1, wherein an outer contour of the first counter abutment and an inner contour of the associated wall opening are so matched that between the two contours an inspection window is defined rendering possible visual inspection of the channel-like housing recess from the side.

15. The linear drive as set forth in claim 1, comprising a pair of cooperating second abutment and counter abutment which as compared with the pair of first abutment and counter abutment takes effect in the opposite stroke direction of the carriage.

16. The linear drive as set forth in claim 15, wherein the second abutment is arranged on a terminal end portion of the carriage within the channel-like housing recess and the second abutment is arranged in an axial extension thereof on a terminating wall, delimiting the housing recess at the end, of the drive housing.

17. The linear drive as set forth in claim 5, wherein the first abutment is arranged on the support wall for stepless axial adjustment.

* * * * *

UNITED STATES PATENT AND TRADEMARK OFFICE
CERTIFICATE OF CORRECTION

PATENT NO.         : 7,207,262 B2                                                Page 1 of 1
APPLICATION NO. : 11/056465
DATED                  : April 24, 2007
INVENTOR(S)        : Angué et al.

It is certified that error appears in the above-identified patent and that said Letters Patent is hereby corrected as shown below:

IN THE SPECIFICATION:

Column 4 line 61,        now reads "axis S"

should read -- axis 5 --.

IN THE CLAIMS:

Column 10, line 16-17,    now reads "carnage"

should read -- carriage --.

Signed and Sealed this

Seventh Day of August, 2007

JON W. DUDAS
*Director of the United States Patent and Trademark Office*